United States Patent Office 3,304,302
Patented Feb. 14, 1967

3,304,302
3-AMINO-2-OXO STEROIDS
Robert L. Clarke, Bethlehem, N.Y., assignor to Sterling Drug Inc., New York, N.Y., a corporation of Delaware
No Drawing. Filed Jan. 4, 1965, Ser. No. 423,353
12 Claims. (Cl. 260—239.5)

This invention relates to amino-steroids and in particular is concerned with steroids of the androstane series having a secondary- or tertiary-amino group in the 3-position and an oxygen function in the position, and with a process for and intermediates in the preparation thereof.

A preferred aspect of the invention is concerned with compounds of the formula

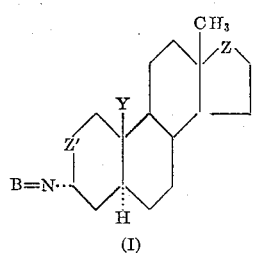

wherein B=N is lower-alkylamino, hydroxy-lower-alkylamino, di-lower alkylamino, polymethylenimino of 5–7 ring members, 4-morpholinyl, 1-piperazinyl or 4-lower-alkyl-1-piperazinyl; Y is hydrogen or methyl; Z is CH(OH-$\beta$), CH(OAcyl-$\beta$, C(lower-alkyl)(OH-$\beta$)

C(lower-alkyl)(OAcyl-$\beta$) or C=O; and Z' is CH(OH-$\beta$), CH(OAcyl-$\beta$) or C=O. Acyl in each instance being carboxylic acyl having from 1 to 10 carbon atoms.

The term "lower-alkyl" as used hereinabove means alkyl having from 1 to 6 carbon atoms, which groups can be straight or branched.

The term "polymethylenimino of 5–7 ring members" used in defining the group B=N, includes 1-pyrrolidyl, 1-piperidyl, 1-hexamethyleniminyl and lower-alkylated derivatives thereof.

In compounds containing an esterified 17$\beta$-hydroxy or 2$\beta$-hydroxy group, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl ($\beta$-carboxypropionyl); cycloalkyl-lower-alkanoyl radicals, e.g., $\beta$-cyclopentylpropionyl, $\beta$-cyclohexylpropionyl, and the like; phenyl-lower-alkanoyl or -alkenoyl radicals, such as phenylacetyl, $\beta$-phenylpropionyl, cinnamoyl, and the like; phenyloxy-lower-alkanoyl radicals, such as p-chlorophenoxyacetyl; pyridine carbonyl, such as nicotinoyl and isonicotinoyl. In those acyl radicals containing phenyl groups, the phenyl groups can be unsubstituted or substituted by one or more inert substituents, for example, lower-alkyl, lower-alkoxy, halogen or nitro.

The compounds of Formula I where Z' is CH(OH-$\beta$) are prepared by reacting a compound of the formula

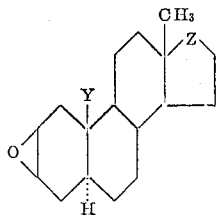

wherein Y and Z have the meanings given hereinabove, with an amine of the formula B=NH. The reaction takes place by heating the steroid and the amine together at a temperature between about 50° C. and 150° C. It is preferred, although not essential, that a weak acid catalyst such as phenol be present in the reaction mixture.

Compounds of Formula I where Z' is CH(OAcyl-$\beta$) or C=O are prepared from the corresponding compounds where Z' is CH(OH-$\beta$) by conventional esterification or oxidation reactions, respectively.

When a compound of the invention is treated with an equivalent amount of an inorganic or organic acid, it is converted to an acid-addition salt form; and when a tertiary-amine of the invention is treated with an equivalent amount of an organic halide or sulfonate, it is converted to a quaternary ammonium salt. The salt forms are the full equivalents of the free bases insofar as the inherent properties of the cationic moiety are concerned. Water-soluble salt forms whose anions are pharmaceutically acceptable are of special interest for therapeutic use, but salt forms which are water-insoluble or contain toxic anions are useful as characterizing derivatives of the free bases, or as intermediates in the purification of the free bases or in the preparation of other salts by ion exchange reactions.

Biological testing of the compounds of Formula I has demonstrated that they possess useful pharmacological, chemotherapeutic and lipid-controlling activities. In particular they show hypotensive, coronary dilator, psychomotor depressant, antibacterial, antifungal and hypocholesteremic activities.

The structures of the compounds of the invention were established by elementary analyses, by the modes of preparation and by spectral data.

The following examples will further illustrate the invention without the latter being limited thereby.

EXAMPLE 1

*3$\alpha$ - (1 - piperidyl)-5$\alpha$-androstane-2$\beta$,17$\beta$-diol 17-acetate.*—[I; B=N is 1-piperidyl, Y is CH$_3$, Z is CH(OCOCH$_3$-$\beta$)

Z' is CH(OH-$\beta$)].

A mixture of 6.00 g. (0.0181 mole) of 2$\beta$,3$\beta$-epoxy-5$\alpha$-androstan-17$\beta$-ol acetate, 5.58 g. (0.066 mole) of piperidine and 1.68 g. (0.018 mole) of phenol was heated at 100° C. for seventeen hours. The reaction mixture was cooled, dissolved in ether containing a small amount of methylene dichloride, and the solution washed with dilute sodium hydroxide and with saturated sodium chloride solution. The organic solution was dried over anhydrous sodium sulfate, concentrated to dryness, and the residue was recrystallized twice from acetonitrile to give 5.25 g. of 3$\alpha$-(1-piperidyl)-5$\alpha$-androstane-2$\beta$,17$\beta$-diol 17-acetate, colorless needles, M.P. 182.0–183.8° C. (corr.); [$\alpha$]$_D^{25}$=+100.0° (1% in chloroform).

3$\alpha$ - (1-piperidyl)-5$\alpha$-androstane-2$\beta$,17$\beta$-diol 17-acetate was obtained in the form of its methiodide salt, M.P. 255.0–255.8° C. (corr.) (recrystallized from methanol); [$\alpha$]$_D^{25}$=+67.8° (1% in ethanol), by treating the free base with an excess of methyl iodide in acetonitrile solution.

EXAMPLE 2

*3$\alpha$-(1-piperidyl)-5$\alpha$-androstane-2$\beta$,17$\beta$-diol.*—[I; B=N is 1-piperidyl, Y is CH$_3$, Z is CH(OH-$\beta$), Z' is CH(OH-$\beta$)]

A mixture of 3.74 g. of 3$\alpha$-(1-piperidyl)-5$\alpha$-androstane-2$\beta$,17$\beta$-diol 17-acetate (Example 1), 4.0 g. of potassium hydroxide, 4 ml. of water and 100 ml. of methanol was heated under reflux for one hour. The reaction mixture was concentrated in vacuo and the residue extracted with ether. The ether was removed and the product recrystallized twice from acetonitrile to give 2.50 g. of 3α-(1-piperidyl)-5α-androstane-2β,17β-diol, M.P. 177.8–180.0° C. (corr.); $[\alpha]_D^{25} = +50.0°$ (1% in ethanol).

EXAMPLE 3

*3α - (1 - piperidyl)-5α-androstane-2β,17β-diol, 2,17-diacetate.*—[I; B=N is 1-piperidyl, Y is CH$_3$, Z is

CH(OCOCH$_3$-β)

Z' is CH(OCOCH$_3$-β)].

A mixture of 2.50 g. of 3α-(1-piperidyl)-5α-androstane-2β,17β-diol (Example 2), 20 ml. of pyridine and 10 ml. of acetic anhydride was heated on a steam bath for one hour, cooled and poured into 300 ml. of ice-water. The solid product was collected and chromatographed on a column of 50 g. of silica gel using ether-pentane (1:4) for elution. Recrystallization of the principal fraction from methanol gave 1.31 g. of 3α-(1-piperidyl)-5α-androstane-2β,17β-diol 2,17-diacetate, M.P. 186.0–188.4° C. (corr.); $[\alpha]_D^{25} = +23.8°$ (1% in chloroform).

By replacing the acetic anhydride in the foregoing preparation by a molar equivalent amount of propionic anhydride, caproyl chloride, succinic anhydride, β-cyclohexylpropionic anhydride, benzoyl chloride, phenylacetyl chloride, cinnamoyl chloride, p-chlorophenoxyacetyl chloride or nicotinoyl chloride, there can be obtained, respectively, 3α-(1-piperidyl)-5α-androstane-2β,17β-diol 2,17-dipropionate, 3α-(1-piperidyl)-5α-androstane-2β,17β-diol 2,17-dicaproate, 3α-(1-piperidyl)-5α-androstane-2β,17β-diol 2,17-di-(hemisuccinate), 3α-(1-piperidyl)-5α-androstane-2β,17β-diol 2,17-di-(β-cyclohexylpropionate), 3α-(1-piperidyl)-5α-androstane-2β,17β-diol 2,17-dibenzoate, 3α - (1 - piperidyl)-5α-androstane-2β,17β-diol 2,17-di-(phenylacetate), 3α - (1-piperidyl-5α-androstane-2β,17β-diol 2,17-dicinnamate, 3α-(1-piperidyl)-5α-androstane-2β,17β-diol 2,17-di-(p-chlorophenoxyacetate), or 3α-(1-piperidyl)-5α-androstane-2β,17β-diol 2,17-dinicotinate.

EXAMPLE 4

*3α-(1-piperidyl)-5α-androstan-17β-ol-2-one 17-acetate.*—[I; B=N is 1-piperidyl, Y is CH$_3$, Z is CH(OCOCH$_3$-β), Z' is C=O].

A solution of 4.15 g. (0.01 mole) of 3α-(1-piperidyl)-5α-androstane-2β,17β-diol 17-acetate (Example 1) in 50 ml. of acetic acid was added dropwise with stirring to a solution of 1.2 g. (0.012 mole) of chromium trioxide in 2 ml. of water and 50 ml. of acetic acid held at 10–15° C. The resulting solution was kept at this temperature for one hour, concentrated by warming in vacuo and the residue was partitioned between ether and water. The ether layer was washed with water, dried over anhydrous sodium sulfate and concentrated. The residue was recrystallized from acetonitrile to give 3.05 g. of 3α-(1-piperidyl) - 5α-androstan-17β-ol-2-one 17-acetate, M.P. 160.0–167.0° C. (corr.); $[\alpha]_D^{25} = +42.1°$ (1% in chloroform).

EXAMPLE 5

(a) *2β,3β - epoxy-17α-methyl-5α-androstan-17β-ol.*—A solution of 18.0 g. (0.047 mole) of 2α-bromo-17α-methyl-5α-androstane-3β,17β-diol in 1100 ml. of dioxane was added to a solution of 37 g. (0.56 mole) of 85% potassium hydroxide in 600 ml. of water, and the mixture was stirred at 60–65° C. for 67 hours. The reaction mixture was concentrated by warming in vacuo to about 500 ml. and extracted twice with ether. A gummy material which was insoluble in both the water and ether was set aside as residue A. The ether extracts were washed with water, dried over anhydrous sodium sulfate and concentrated to dryness. The residue was chromatographed on a column of 100 g. of silica gel, and the column was eluted with etherpentane (first 1:9, then 1:4). The product was recrystallized from acetonitrile to give 2.7 g. of 2β,3β-epoxy-17α-methyl-5α-androstan-17β-ol, massive colorless prisms, M.P. 163.0–164.0° C. (corr.); $[\alpha]_D^{25} = +23.9°$ (1% in chloroform).

Residue A was crystallized from dilute methanol and chromatographed to give an additional 5.4 g. of 2β,3β-epoxy-17α-methyl-5α-androstan-17β-ol.

2β,3β-epoxy-17α-methyl-5α-androstan-17β-ol was found to promote growth and to have myotrophic and androgenic activity when administered subcutaneously to rats.

(b) *17α - methyl - 3α-(1-piperidyl)-5α-androstane-2β,17β-diol.*—[I; B=N is 1-piperidyl, Y is CH$_3$, Z is

C(CH$_3$)(OH-β)

Z' is CH(OH-β)] was prepared by reacting 2β,3β-epoxy-17α-methyl-5α-androstan-17β-ol with piperidine according to the procedure of Example 1, and was obtained in the form of colorless needles, M.P. 223.0–223.8° C. (corr.) (evacuated tube) when recrystallized from ethanol;

$$[\alpha]_D^{25} = +93.7°$$

(1% in chloroform).

17α - methyl - 3α-(1-piperidyl)-5α-androstane-2β,17β-diol when heated for an extended period with acetic anhydride in pyridine at 100° C. is converted to its 2β,17β-diacetate [I; B=N is 1-piperidyl, Y is CH$_3$, Z is

C(CH$_3$)(OCOCH$_3$-β)

Z' is CH(OCOCH$_3$-β)].

By reacting the appropriate amine with the appropriate 2β,3β-epoxy-steroid according to the procedure of Example 1, the following compounds were prepared:

*3α-dimethylamino-5α-androstane-2β,17β - diol 17 - acetate.*—[I; B=N is (CH$_3$)$_2$N, Y is CH$_3$, Z is

CH(OCOCH$_3$-β)

Z' is CH(OH-β)], colorless plates, M.P. 17.0–171.8° C. (corr.) (from acetonitrile); $[\alpha]_D^{25} = +69.1°$ (1% in chloroform). In this case the reaction mixture was heated in a sealed tube because of the volatility of the dimethylamine used.

*3α-hexamethylenimino-5α-androstane - 2β,17β - diol 17-acetate.*—[I; B=N is (CH$_2$)$_6$N, Y is CH$_3$, Z is

CH(OCOCH$_3$-β)

Z' is CH(OH-β)], M.P. 163.2–165.4° C. (corr.) (from acetonitrile); $[\alpha]_D^{25} = +95.0°$ (1% in chloroform).

*3α-ethylamino-5α-androstane-2β,17β-diol 17-acetate.*—[I; B=N is C$_2$H$_5$NH, Y is CH$_3$, Z is CH(OCOCH$_3$-β), Z' is CH(OH-β)], colorless needles, M.P. 135.2–137.2° C. (corr.) (from acetonitrile); $[\alpha]_D^{25} = +27.4°$ (1% in ethanol). In this case the reaction mixture was heated in a sealed tube because of the volatility of the ethylamine used.

*3α-(1-piperidyl)-5α-androstan-2β-ol-17-one.*—[I; B=N is 1-piperidyl, Y is CH$_3$, Z is C=O, Z' is CH(OH-β)], colorless needles, M.P. 158.6–162.6° C. (corr.) (from acetonitrile); $[\alpha]_D^{25} = +176.1°$ (1% in chloroform).

*3α-(2-hydroxyethylamino) - 5α - androstane - 2β,17β-diol.*—[I; B=N is HOCH$_2$CH$_2$NH, Y is CH$_3$, Z is CH(OH-β), Z' is CH(OH-β)], M.P. 203.8–205.4° C. (corr.) (from methanol); $[\alpha]_D^{25} = +34.5°$ (1% in ethanol).

*3α-(4-methyl-1-piperazinyl) - 5α - androstane - 2β,17β-diol.*—[I; B=N is 4-methyl-1-piperazinyl, Y is CH$_3$, Z is CH(OH-β), Z' is CH(OH-β)], M.P. 217.2–219.4° C. (corr.) (from dioxane); $[\alpha]_D^{25} = +35.3°$ (1% in chloroform).

According to the procedure of Example 1, 2β,3β-epoxy-5α-androstan-17β-ol acetate can be reacted with morpholine or piperazine to give, respectively, 3α-(4-morpholinyl)-5α-androstane-2β,17β-diol 17-acetate [I; B=N is 4-morpholinyl, Y is CH$_3$, Z is CH(OCOCH$_3$-β), Z' is CH(OH-β)], or 3α-(1-piperazinyl)-5α-androstane-2β,17β-diol 17-acetate; [I; B=N is 1-piperazinyl, Y is CH$_3$, Z is CH(OCOCH$_3$-β), Z' is CH(OH-β)]; and 2β,3β-epoxy-19-nor-5α-androstan-17β-ol can be reacted with piperidine to give 3α-(1-piperidyl)-19-nor-5α-androstane-2β,17β-diol [I; B=N is 1-piperidyl, Y is H, Z is CH(OH-β), Z' is CH(OH-β)].

3α-(1-piperidyl)-5α-androstan-2β-ol-17-one can be oxidized with chromium trioxide according to the procedure of Example 4 to give 3α-(1-piperidyl)-5α-androstane-2,17-dione [I; B=N is 1-piperidyl, Y is CH₃, Z is C=O, Z' is C=O].

I claim:
1. A compound of the formula

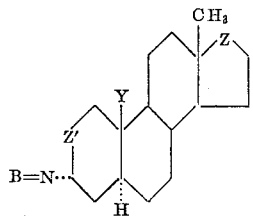

wherein:

B=N is a member of the group consisting of lower-alkylamino, hydroxy-lower-alkylamino, di-lower-alkylamino, polymethylenimino of 5–7 ring members, 4-morpholinyl, 1-piperazinyl, and 4-lower-alkyl-1-piperazinyl;
Y is a member of the group consisting of hydrogen and methyl;
Z is a member of the group consisting of CH(OH-β), CH(OAcyl-β), C(lower-alkyl)(OH-β), C(lower-alkyl)(OAcyl-β), and C=O; and Z' is a member of the group consisting of CH(OH-β), CH(OAcyl-β) and C=O;

Acyl in each instance being carboxylic acyl having from 1 to 10 carbon atoms.

2. 3α-(1-piperidyl)-5α-androstane-2β,17β-diol 17-acetate.
3. 3α-(1-piperidyl)-5α-androstane-2β,17β-diol.
4. 3α-(1-piperidyl)-5α-androstane-2β,17β-diol 2,17-diacetate.
5. 3α-(1-piperidyl)-5α-androstan-17β-ol-2-one 17-acetate.
6. 17α-methyl-3α-(1-piperidyl)-5α-androstane-2β,17β-diol.
7. 3α-dimethylamino-5α-androstane-2β,17β-diol 17-acetate.
8. 3α-hexamethylenimino-5α-androstane-2β,17β-diol 17-acetate.
9. 3α-ethylamino-5α-androstane-2β,17β-diol 17-acetate.
10. 3α-(1-piperidyl)-5α-androstan-2β-ol-17-one.
11. 3α-(2-hydroxyethylamino)-5α-androstane-2β,17β-diol.
12. 3α-(4-methyl-1-piperazinyl)-5α-androstane-2β,17β-diol.

References Cited by the Examiner

Batres et al.: J. Org. Chem., vol. 26, pages 878–880.
Chem. Abs., vol. 53, column 5343(e), 1959.

LEWIS GOTTS, *Primary Examiner.*

H. A. FRENCH, *Assistant Examiner.*